United States Patent
Jerzak et al.

(10) Patent No.: US 9,405,854 B2
(45) Date of Patent: Aug. 2, 2016

(54) EVENT STREAM PROCESSING PARTITIONING

(71) Applicants: Zbigniew Jerzak, Dresden (DE); Ibrahim Ahmed, Waterloo (CA); Palaniappan Gandhi, Flossmoor, IL (US)

(72) Inventors: Zbigniew Jerzak, Dresden (DE); Ibrahim Ahmed, Waterloo (CA); Palaniappan Gandhi, Flossmoor, IL (US)

(73) Assignee: SYBASE, INC., Dublin, CA (US)

( * ) Notice: Subject to any disclaimer, the term of this patent is extended or adjusted under 35 U.S.C. 154(b) by 208 days.

(21) Appl. No.: 14/203,248

(22) Filed: Mar. 10, 2014

(65) Prior Publication Data

US 2015/0169786 A1 Jun. 18, 2015

Related U.S. Application Data

(60) Provisional application No. 61/916,517, filed on Dec. 16, 2013.

(51) Int. Cl.
*G06F 17/30* (2006.01)

(52) U.S. Cl.
CPC .... *G06F 17/30958* (2013.01); *G06F 17/30433* (2013.01); *G06F 17/30516* (2013.01)

(58) Field of Classification Search
CPC ............... G06F 17/30516; G06F 17/30433; G06F 17/30958
USPC .................. 707/610, 713, 718, 769; 709/231; 706/12, 48

See application file for complete search history.

(56) References Cited

U.S. PATENT DOCUMENTS

| | | | | |
|---|---|---|---|---|
| 5,873,081 | A * | 2/1999 | Harel | G06F 17/30699 |
| 7,734,602 | B2 * | 6/2010 | Folkert | G06F 17/30336 707/610 |
| 7,809,712 | B2 * | 10/2010 | Witkowski | G06F 17/246 707/713 |
| 7,890,497 | B2 * | 2/2011 | Folkert | G06F 17/30383 707/602 |
| 8,024,480 | B2 | 9/2011 | DiStefano | |
| 8,126,870 | B2 * | 2/2012 | Chowdhuri | G06F 17/30445 707/636 |
| 8,166,047 | B1 * | 4/2012 | Cohen | G06F 17/30424 706/48 |
| 8,195,648 | B2 * | 6/2012 | Zabback | G06F 17/30451 706/12 |
| 8,214,324 | B2 | 7/2012 | Joerg et al. | |
| 8,229,968 | B2 * | 7/2012 | Wang | G06F 12/0875 707/748 |
| 8,266,147 | B2 * | 9/2012 | Slezak | G06F 17/30386 707/737 |

(Continued)

FOREIGN PATENT DOCUMENTS

WO WO 2007109446 A1 * 9/2007 ............. G06F 17/30

*Primary Examiner* — Frantz Coby
(74) *Attorney, Agent, or Firm* — Schwegman Lundberg & Woessner, P.A.

(57) ABSTRACT

In an example embodiment, event stream processing is performed by first parsing an input query into a directed acyclic graph (DAG) including a plurality of operator nodes. Then a grouping of one or more of the operator nodes is created. One or more partitions are created, either by the user or automatically, in the DAG by forming one or more duplicates of the grouping. A splitter node is created in the DAG, the splitter node splits data from one or more event streams and distributes it among the grouping and the duplicates of the grouping. Then, the input query is resolved by processing data from one or more event streams using the DAG.

20 Claims, 8 Drawing Sheets

(56) References Cited

U.S. PATENT DOCUMENTS

| | | | |
|---|---|---|---|
| 8,447,739 B2 | 5/2013 | Naibo et al. | |
| 8,478,742 B2* | 7/2013 | Folkert | G06F 17/30457 707/609 |
| 8,595,234 B2* | 11/2013 | Siripurapu | G06F 17/30864 707/737 |
| 8,655,825 B2 | 2/2014 | Roesch et al. | |
| 8,666,993 B2* | 3/2014 | Chunilal | G06F 17/30861 705/14.54 |
| 9,262,479 B2* | 2/2016 | Deshmukh | G06F 17/30463 |
| 9,298,788 B1* | 3/2016 | Kekre | G06F 17/30569 |
| 2006/0010093 A1* | 1/2006 | Fan | G06F 17/30017 |
| 2006/0200251 A1* | 9/2006 | Gu | H04L 12/4641 700/1 |
| 2010/0161551 A1* | 6/2010 | Whynot | G06F 11/2094 707/610 |
| 2011/0302583 A1 | 12/2011 | Abadi et al. | |
| 2011/0314019 A1 | 12/2011 | Peris et al. | |
| 2012/0173747 A1* | 7/2012 | Roesch | G06Q 10/063 709/231 |
| 2013/0046725 A1 | 2/2013 | Cammert et al. | |
| 2013/0132560 A1 | 5/2013 | Hudzia et al. | |
| 2013/0138473 A1 | 5/2013 | Balko et al. | |
| 2013/0144866 A1 | 6/2013 | Jerzak et al. | |
| 2013/0160024 A1 | 6/2013 | Shtilman et al. | |
| 2013/0346390 A1 | 12/2013 | Jerzak | |
| 2014/0006384 A1 | 1/2014 | Jerzak et al. | |
| 2014/0068576 A1 | 3/2014 | Pendap et al. | |

* cited by examiner

EVENT STREAM PROCESSING PARTITIONING

CROSS-REFERENCE TO RELATED APPLICATIONS

This application claims the benefit of U.S. Provisional Application No. 61/916,517, filed Dec. 16, 2013, entitled "EVENT STREAM PROCESSING PARTITIONING," which is incorporated herein by reference in its entirety.

TECHNICAL FIELD

This document generally relates to systems and methods for use with event streams. More specifically, this document relates to methods and systems for complex event processing partitioning.

BACKGROUND

Event stream processing (ESP) is a set of technologies designed to assist the construction of event-driven information systems. ESP technologies may include event visualization, event databases, event-driven middleware, and event processing languages, or complex event processing (CEP). ESP deals with the task of processing multiple streams of event data with the goal of identifying the meaningful events within those streams. ESP enables applications such as algorithmic trading in financial services, radio frequency identification (RFID) event processing applications, fraud detection, process monitoring, and location-based services in mobile devices. Within an ESP system a continuous data stream (comprising multiple, consecutive data items) is pushed through a query. Results of the query are subsequently pushed out of the system. Queries in ESP systems can be decomposed into a network of operators, each operator representing an atomic processing block. The operator network forms a directed, acyclic graph (DAG). Vertices of the DAG describe operators, while edges indicate the data flow. The total throughput, or the number of data items processed within a unit of time, is limited by the slowest operator in the DAG. This can lead to some operators being over-utilized while others are under-utilized, leading to suboptimal usage of the underlying system resources.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, partitioning is performed in an ESP system to better utilize system resources. This partitioning can occur at the operator level, at a higher level where groups of operators are partitioned, or even at the server level. Different partitions can then be assigned to different system resources and event streams can be split among the different partitions, resulting in better usage of system resources.

Figure 1:
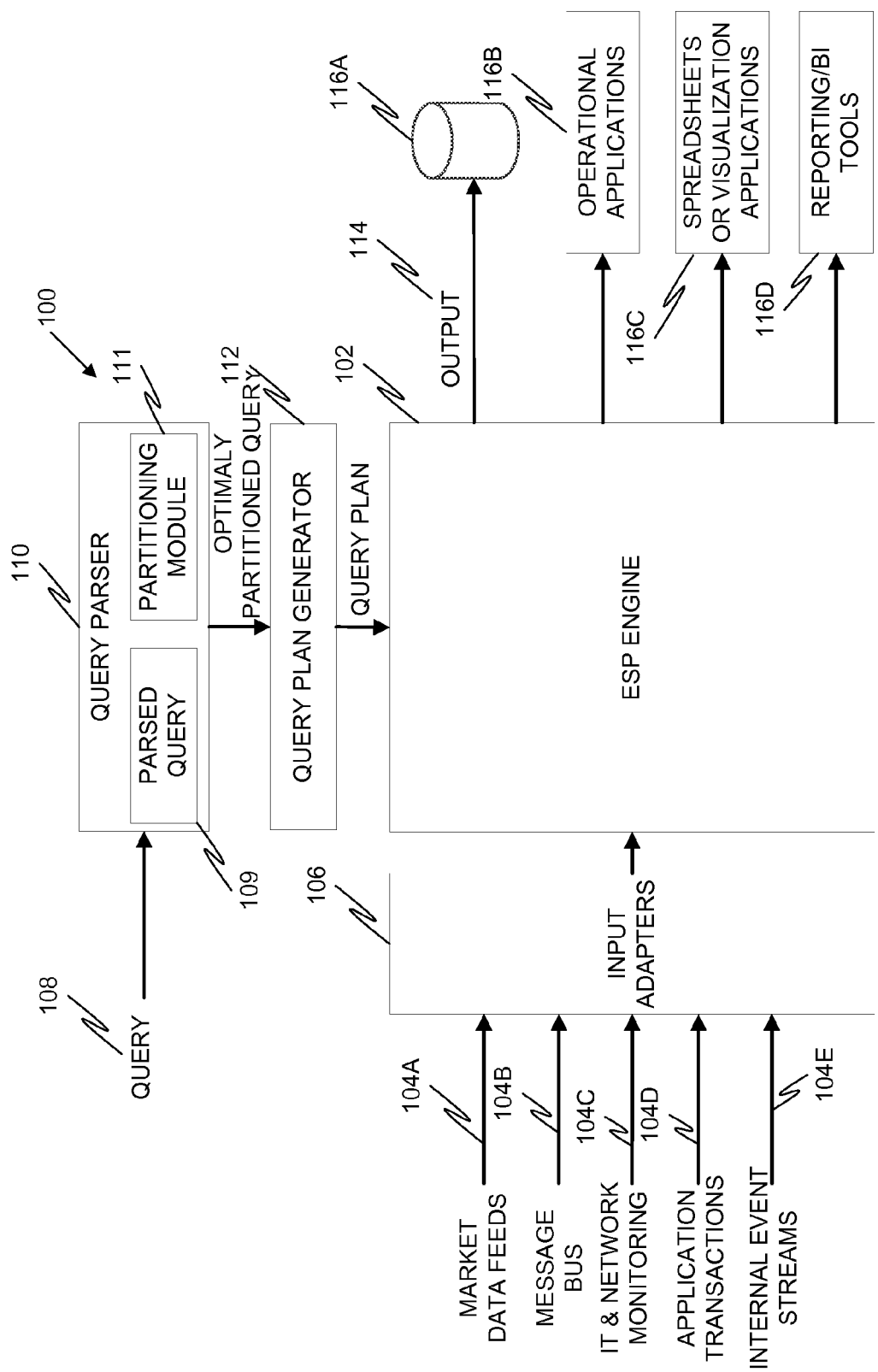
FIG. 1 is a diagram illustrating a system for event stream processing in accordance with an example embodiment.

FIG. 1 is a diagram illustrating a system 100 for event stream processing in accordance with an example embodiment. An ESP engine 102 may receive one or more event streams 104A-104E via input adapters 106. The event streams 104A-104E can relate to, for example, market data feeds, message buses, network monitoring, application transactions, internal event streams, etc. A query 108 may be parsed by a query parser 110 to create a parsed query 109. The query parser 110 can decompose the parsed query 109 into a network of operators, each operator representing an atomic processing block, and represent the parsed query 109 and a directed, acyclic graph (DAG). In one embodiment, the query parser 110 includes a partitioning module 111 to partition the DAG to create an optimal partitioned query 112 (an optimal DAG) to better utilize system resources, as described in greater detail in conjunction with FIG. 3 below. The optimal partitioned query 112 is passed to a query plan generator 112, which can generate a query plan based on the optimal partitioned query 112 and send the query plan to the ESP engine 102. The ESP engine 102 may then utilize the query plan to obtain appropriate data matching the query plan from the event streams 104A-104E, and send the data as output 114.

In an example embodiment, the output 114 may be sent to a variety of different possible destinations, including databases 116A, operational applications 116B, spreadsheets or visualization applications 116C, and reporting/business intelligence (BI) tools 116D.

Figure 2:
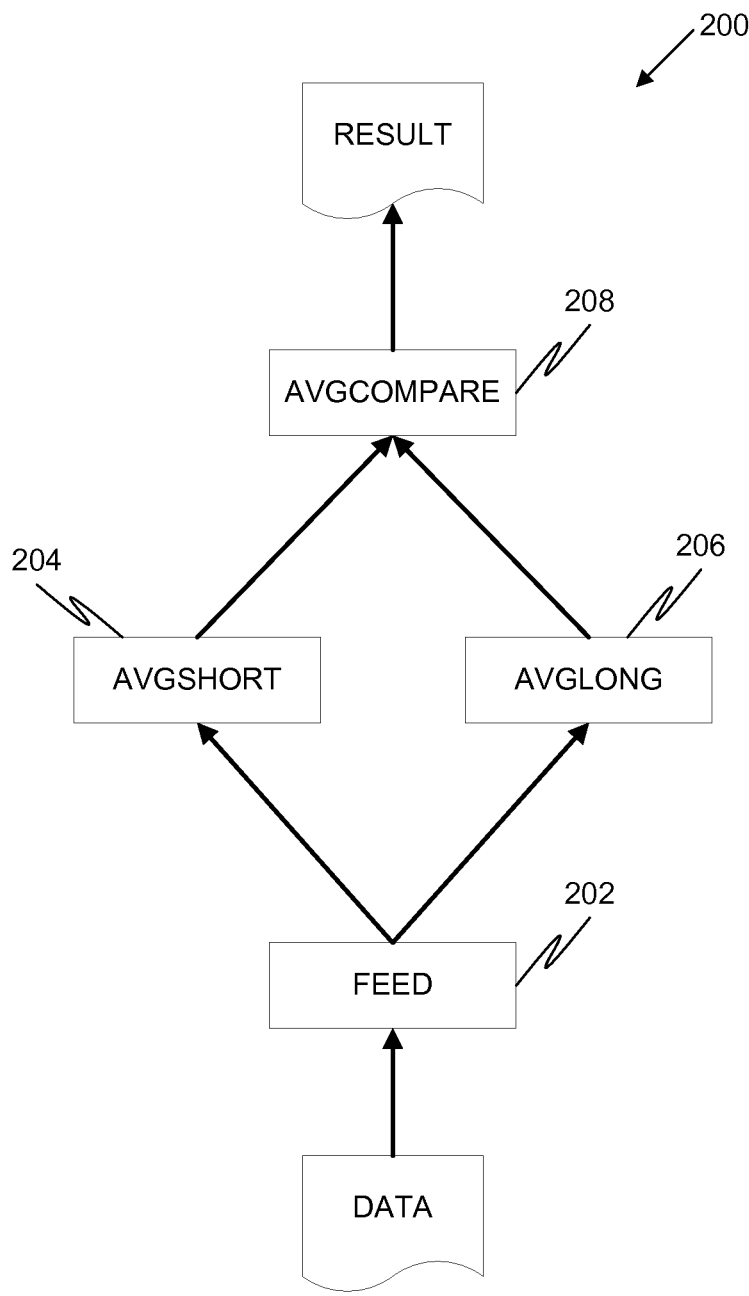
FIG. 2 is a diagram illustrating a parsed ESP query in accordance with an example embodiment.

FIG. 2 is a diagram illustrating a parsed ESP query in accordance with an example embodiment. As described above, the parsed ESP query (e.g., parsed query 109) can be represented as a DAG 200 including operators 202, 204, 206, 208. The total throughput of the parsed query is limited by the slowest operator. Here, it may be assumed that the AvgLong operator 206 is the slowest. The result is that the AvgLong operator 206 is a hot operator which, if nothing else is done, will be over-utilized while the other operators 202, 204, 208 are cold operators, meaning that they are under-utilized. The magnitude of the problem increases with the imbalance between hot and cold operators as well as the percentage of cold operators. The result is a lower than possible overall query throughput measured as a number of data items processed per second. DAG 200 can be optimized by the partitioning module 111 as described in greater detail below in conjunction with FIG. 3.

Below is an example instantiation of the parsed query presented in FIG. 2.

```
CREATE SCHEMA priceSchema (Id INTEGER, Symbol
  STRING, Price FLOAT, Shares INTEGER, TradeTime
  DATE) ;
CREATE SCHEMA averageSchema (Symbol STRING,
  AvgPrice FLOAT, TotalShares INTEGER,
  RecordsSeen LONG, LastTime DATE) ;
CREATE SCHEMA joinSchema (Symbol STRING,
  AvgShort FLOAT, AvgLong Float, Change FLOAT,
  LastTime DATE);
CREATE INPUT WINDOW Feed SCHEMA priceSchema
  PRIMARY KEY (Id) KEEP 1000 ROWS PER (Symbol);
CREATE OUTPUT WINDOW AvgShort SCHEMA
  averageSchema PRIMARY KEY DEDUCED
  AS SELECT
    F.Symbol,
    avg(F.Price) as AvgPrice,
    sum(F.Shares) as TotalShares,
    count(*) as RecordsSeen,
    max(F.TradeTime) as LastTime
  FROM Feed as F KEEP 100 ROWS PER (Symbol)
  GROUP BY F.Symbol;
CREATE OUTPUT WINDOW AvgLong SCHEMA
  averageSchema PRIMARY KEY DEDUCED
  AS SELECT
    F.Symbol,
    avg(F.Price) as AvgPrice,
    sum(F.Shares) as TotalShares,
    count(*) as RecordsSeen,
    max(F.TradeTime) as LastTime
  FROM Feed as F
  GROUP BY F.Symbol;
CREATE OUTPUT WINDOW AvgCompare SCHEMA
  joinSchema PRIMARY KEY DEDUCED
  AS
  SELECT
    ASH.Symbol AS Symbol,
    ASH.AvgPrice AS AvgShort,
    ALN.AvgPrice AS AvgLong,
    ((ASH.AvgPrice – ALN.AvgPrice)/ASH.AvgPrice)
  AS Change,
    maxof(ASH.LastTime, ALN.LastTime) as
  LastTime
  FROM
    AvgShort as ASH KEEP 1 ROW PER (Symbol) JOIN
    AvgLong as ALN KEEP 1 ROW PER (Symbol) on
    ASH.Symbol = ALN.Symbol;
```

The above comprises four example operators: (1) an input window feed; (2) an AvgShort window; (3) an AvgLong window; and (4) an AvgCompare window. Data is fed into the feed window with results being produced by the AvgCompare window.

When executing the above example in an ESP system, the partitioning module 111 can determine the utilizations of the operators and determine which operator is a bottleneck. The partitioning module 111 can use the determinations to optimize a DAG (e.g., DAG 200). For example, the partitioning module 111 may observe that the AvgLong window is the bottleneck, with remaining windows only being lightly utilized. In an example embodiment, the partitioning module 111 may determine that the utilization of the AvgLong window equals 100% while that of AvgShort equals 32%, AvgCompare equals 28% and Feed equals 8%. The partitioning module 111 can calculate the overall system utilization as the sum of each of the operator utilizations. The overall query throughput equals 11,000 data items per time unit.

Figure 3:
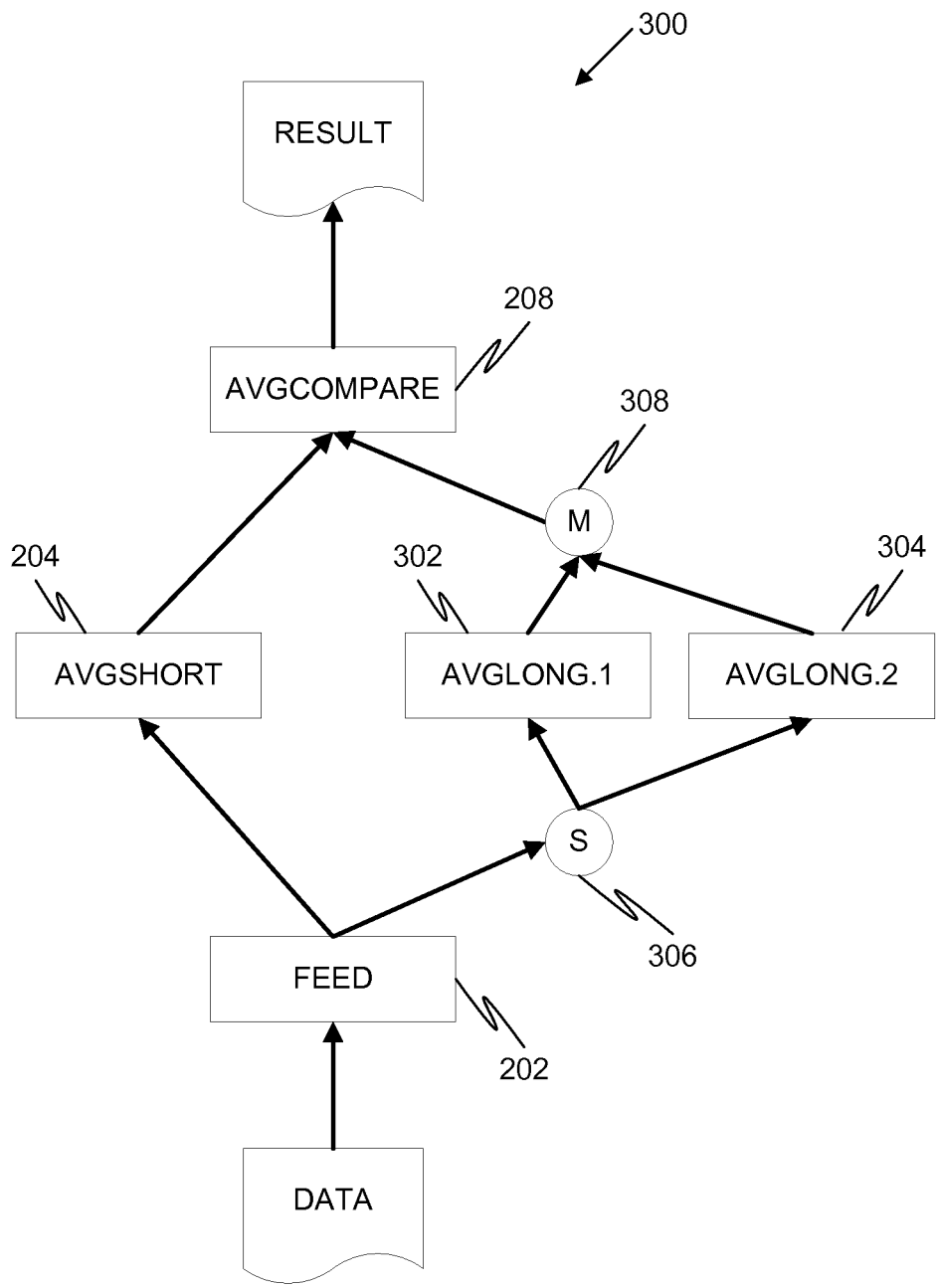
FIG. 3 is a diagram illustrating a parsed query that has been optimally partitioned in accordance with an example embodiment.

FIG. 3 is a diagram illustrating a parsed query that has been optimally partitioned in accordance with an example embodiment. Here, the partitioning module 111 partition DAG 200 of FIG. 2 into a new DAG 300, for example, based on the determined operator utilizations and bottleneck operator. While operators 202, 204, and 208 remain unchanged, the bottleneck operator (e.g., operator 206) has been partitioned into two operators 302, 304. The partitioned operators 302, 304 represent copies of operator 206. Additionally, a splitter operator 306 is added. The splitter operator 306 is responsible for splitting the incoming event stream(s) between the partitioned operators 302, 304. This may be performed in accordance with a splitting strategy, which will be described in more detail below.

Also added is a merge operator 308. The merge operator 308 is responsible for consolidating the results of the partitioned operators 302, 304, before being pushed for further processing by operator 208.

To create an optimal partitioned query, for example, as represented by DAG 300, the partition module 111 can add additional elements to the query source code. The following is an example alteration to the AvgLong operator source code, with the bolded text representing the added elements:

```
CREATE OUTPUT WINDOW AvgLong SCHEMA
  averageSchema PRIMARY KEY DEDUCED
  PARTITION BY Feed HASH(Symbol)
  PARTITIONS 4
  AS SELECT
    F.Symbol,
    avg(F.Price) as AvgPrice,
    sum(F.Shares) as TotalShares,
    count(*) as RecordsSeen,
    max(F.TradeTime) as LastTime
  FROM Feed as F
  GROUP BY F.Symbol;
```

The partitioning module 111 can include processing logic that can comprise hardware (e.g., circuitry, dedicated logic, programmable logic, microcode, etc.), software (e.g., instructions run on a processing device), or a combination thereof to measure throughput of various operators and determine the most optimal partitioning scheme and partitioning degree to utilize. This partitioning scheme along with the degree can then be automatically applied to the operators.

The goal of operator partitioning is to create n instances of a given hot operator. An operator in an ESP system can be either stateless or stateful. Results of a stateless operator depend on the data item being currently processed. Specifically, no previous or subsequent data items influence the results of the processing of the current data tem. In contrast, results of a stateful operator depend on the current as well as previously seen data items.

The process of partitioning an operator can be applied either before a query 108 is started (static) or when the query 108 is already running (dynamic). For a static query, the partitioning may involve creating a number of n copies of the operator. For dynamic partitioning, in the case of stateful operators, the so-far accumulated state needs also to be redistributed across the copies. This can be achieved by repartitioning the accumulated state using the data stream splitting operator 306.

The goal of the splitter operator 306 is to partition the incoming data stream across the n copies of the partitioned operator. In an example embodiment, there may be three different partitioning strategies, which can be used depending on the type of the partitioned operator. The three strategies are (1) round-robin, (2) hash based, and (3) custom.

The round-robin strategy splits the data stream by delivering each data item in the input stream to a subsequent copy of the partitioned operator. For the two partitions in the example above, a first data item in an incoming data stream may be delivered to the first partitioned operator 302 and the second data item to the second partitioned operator 304. Then the third data item may be delivered to the first partitioned operator 302 and the fourth data item to the second partitioned operator 304, and so on. The round-robin strategy is particularly well suited for stateless operators.

The hash-based strategy uses the content of the data items to choose the target copy of the partitioned operator. A data item can contain multiple data fields, with each field determined by a unique name. The hash-based strategy applies a hash function to a given field or set of fields. The obtained value is subsequently subjected to a modulo operation with the hash value being the dividend and the number of copies of the partitioned operator being the divisor. The remainder of the modulo operation determines the copy which should receive a given data item. The hash based partitioning strategy is especially well suited for stateful operations.

The custom strategy can be based on received user input. For example, the partitioning module 111 can receive user input of logic which determines the target copy for a given data item. The user-provided function may return a natural number, which is less than or equal to the total number of copies, assuming that the first copy is denoted by 1, the second copy by 2, and so on. Alternatively, a custom strategy may be developed automatically by intelligence built into the system to determine an optimum splitting scheme.

Custom partitioning may be used to allow other schemes, such as range-based partitioning, to be implemented.

A merge operator 308 performs a logical union of all data items its incoming data streams. Optionally, the merge operator 308 can be augmented with a sorting operator to ensure a deterministic ordering of elements. The merge operator itself is optional and the merging may be performed externally to further improve performance.

It should be noted that while the above examples describe partitioning a single operator into two operators, in reality each operator can potentially be partitioned into any number of operators, and this disclosure should not be limited to applications where two partitions are formed.

Figure 4:
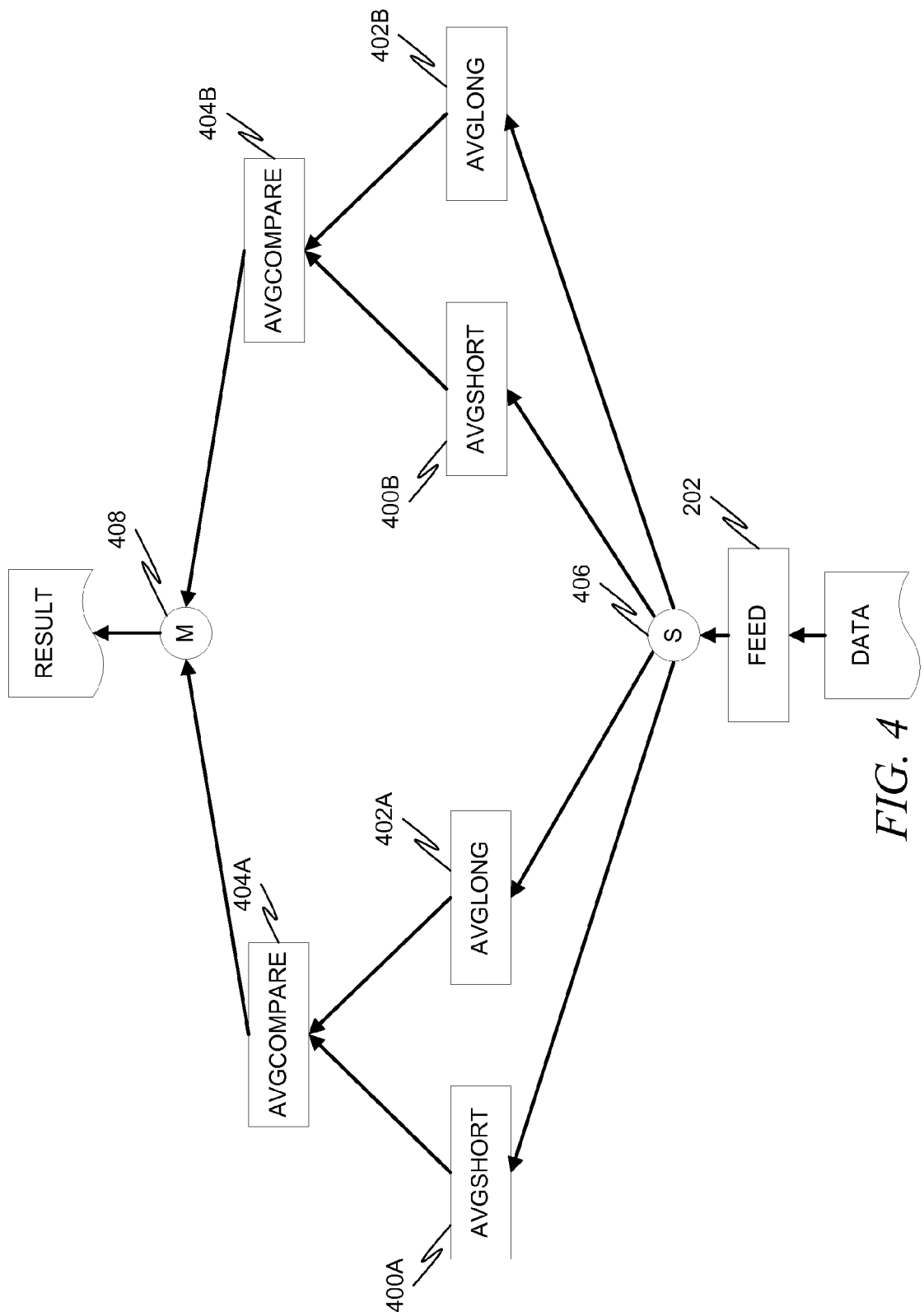
FIG. 4 is a diagram illustrating a partitioning of a grouping of operators in accordance with an example embodiment.

Furthermore, the partitioning schemes described above need not be performed only at the operator level. Various different levels of groupings of operators could be partitioned as a whole. Each grouping may be considered a module. FIG. 4 is a diagram illustrating a partitioning of a grouping of operators 204, 206, 208 in accordance with an example embodiment. As can be seen, operators 204, 206, and 208 are partitioned as a group (module) into operators 400A, 402A, 404A and operators 400B, 402B, 404B (two copies of the module). Splitting operator 406 then splits the input data stream(s) among these two groupings (modules), while merge operator 408 merges the results from these two groupings (modules).

Additionally, in another example embodiment, the partitioning may be nested. For example, the partitioned modules in FIG. 4 may be further partitioned so that some of its operators (for example, operator 404B in FIG. 4) are partitioned as well.

In another example embodiment, partitioning may occur at the server level. Consider a complex project in ESP that has at its end an output adapter to persist data. Due to the complexity of the project, the data going into the adapter may be much less than what it can handle. To achieve the desired throughput, one option is to scale out. The same project can be deployed on multiple ESP nodes. A custom external adapter that uses an ESP software development kit (SDK) may be written to divide up the incoming traffic to these nodes.

In an example embodiment, this splitting of incoming traffic may be performed automatically, and partitioning and uniting of data may be performed on publishing and subscription respectively. Additionally, multiple instances of the project may be instantiated on different services. This reduces the need for custom adapter logic to be created.

In an example embodiment, multiple instances of an ESP project are instantiated on startup. A user defines the number of instances required. In an alternative embodiment, the number of instances required may be calculated automatically by the system. ESP node affinities may be chosen by default and may be user-configurable. On project deployment, a cluster manager may spawn the requested instances of the project. The instance allocation on different nodes may be performed intelligently to maximize throughput. If high availability is enabled, the server may spawn a high availability instance for each of the partitioned instances. Each high availability instance may be linked to its partitioned instance.

The user publishing data into ESP using the SDK does not need to be aware of the number of partitions available. In some example embodiments, the user sets the partitioning function based on which incoming data will be partitioned across the instances. The partitioning functions may be selected from, for example, hash, round-robin, broadcast, and custom. Hash uses a hash function to calculate the hash key, based on which the partition instance is calculated. Round-robin simply partitions elements one after the other. Broadcast broadcasts the data to all partitions. Custom provides a way to define the partitioning algorithm in a different manner. The SDK may communicate with the cluster manager to obtain the number of instances available for the deployed project.

On subscription to an output stream in a partitioned project, the user does not need to know the number of instances. The SDK communicates with the cluster manager to obtain the number of partitioned instances. It then subscribes to all the instances and combines the results, making them available to the user.

Figure 5:
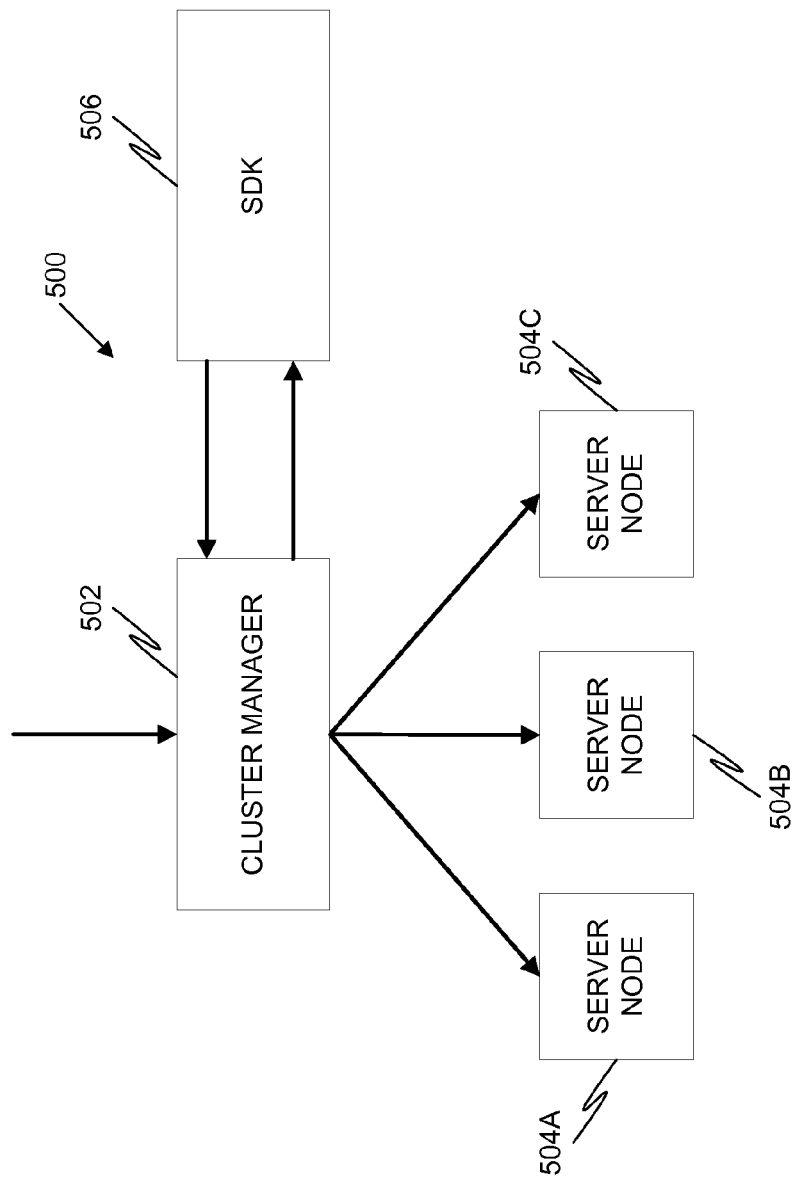
FIG. 5 is a block diagram illustrating a system for server partitioning in accordance with an example embodiment.

FIG. 5 is a block diagram illustrating a system for server partitioning in accordance with an example embodiment. The system 500 may include a cluster manager 502, which receives input data streams and determines which of a plurality of server nodes 504A, 504B, and 504C to send the input data. Each server node 504A, 504B, 504C may correspond to the ESP engine 102 of FIG. 1. Each project may then be partitioned among the server nodes 504A, 504B, 504C. An SDK 506 may then obtain information about how the project is distributed among the server nodes 504A, 504B, 504C from the cluster manager 502 and, from that point, the input may be directly served to the precise server nodes 504A, 504B, 504C as needed using the information from the SDK 506.

Figure 6:
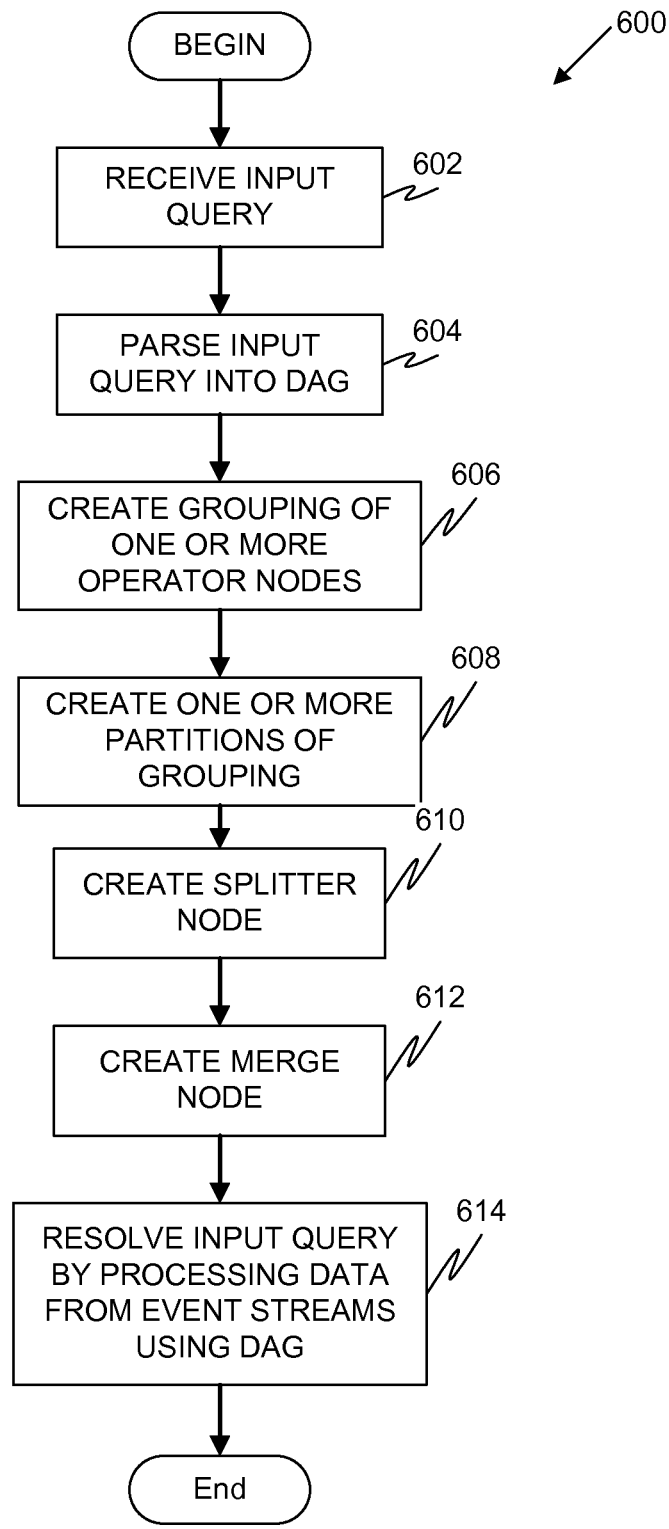
FIG. 6 is a flow diagram illustrating a method for performing event stream processing in accordance with an example embodiment.

FIG. 6 is a flow diagram illustrating a method 600 for performing event stream processing in accordance with an example embodiment. Method 600 can be performed by processing logic that can comprise hardware (e.g., circuitry, dedicated logic, programmable logic, microcode, etc.), software (e.g., instructions run on a processing device), or a combination thereof. In one implementation, the at least one or more portions of method 600 are performed by the partitioning module 111 of FIG. 1, as described above. At operation 602, an input query is received. At operation 604, the input query is parsed into a DAG 300 including a plurality of operator nodes. At operation 606, a grouping of one or more of the operator nodes is created.

At operation 608, one or more partitions are created in the DAG 300 by forming one or more duplicates of the grouping. At operation 610, a splitter node is created in the DAG 300, the splitter node splitting data from one or more event streams 104A-104E among the grouping and the duplicates of the grouping. At operation 612, a merge node is created in the DAG 300, the merge node consolidating data from the grouping and the duplicates of the grouping. At operation 614, the input query is resolved by processing data from one or more event streams 104A-104E using the DAG 300.

Example Mobile Device

Figure 7:
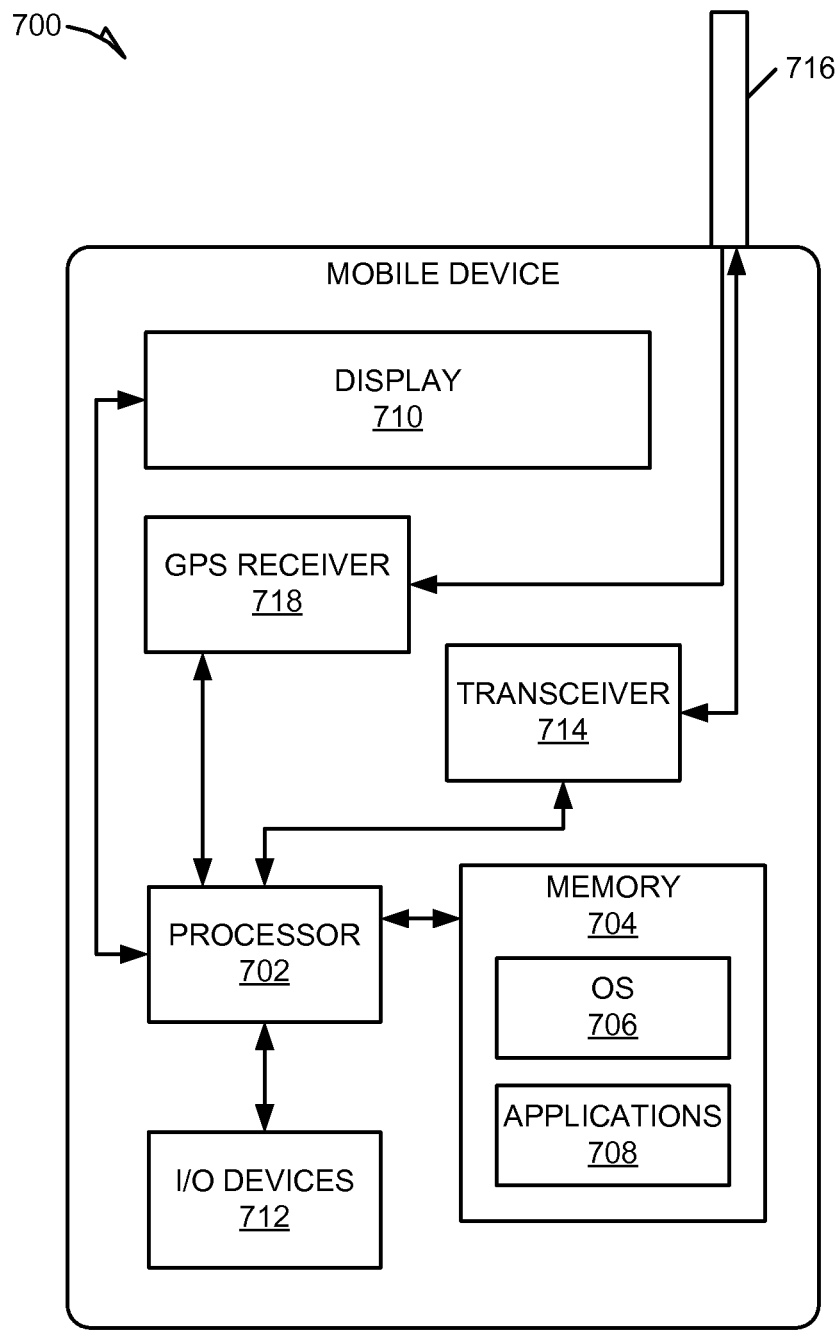
FIG. 7 is a block diagram illustrating a mobile device, according to an example embodiment.

FIG. 7 is a block diagram illustrating a mobile device 700, according to an example embodiment. The mobile device 700 may include a processor 702. The processor 702 may be any of a variety of different types of commercially available processors 702 suitable for mobile devices 700 (for example, an XScale architecture microprocessor, a microprocessor without interlocked pipeline stages (MIPS) architecture processor, or another type of processor 702). A memory 704, such as a random access memory (RAM), a flash memory, or other type of memory, is typically accessible to the processor 702. The memory 704 may be adapted to store an operating system (OS) 706, as well as application programs 708. The processor 702 may be coupled, either directly or via appropriate intermediary hardware, to a display 701 and to one or more input/output (I/O) devices 712, such as a keypad, a touch panel sensor, a microphone, and the like. Similarly, in some embodiments, the processor 702 may be coupled to a transceiver 714 that interfaces with an antenna 716. The transceiver 714 may be configured to both transmit and receive cellular network signals, wireless data signals, or other types of signals via the antenna 716, depending on the nature of the mobile device 700. Further, in some configurations, a GPS receiver 718 may also make use of the antenna 716 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 702 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 702 or other programmable processor 702) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 702 configured using software, the general-purpose processor 702 may be configured as respective different hardware-implemented modules at different times. Software may accordingly configure a processor 702, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output 114 of that operation in a memory device to which it is communicatively coupled. A further hardware-implemented module may then, at a later time, access the memory device to retrieve and process the stored output 114. Hardware-implemented modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors 702 or processor-implemented modules. The performance of certain of the operations may be distributed among the one or more processors 702, not only residing within a single machine, but deployed across a number of machines. In some example embodiments, the processor 702 or processors 702 may be located in a single location (e.g., within a home environment, an office environment or as a server farm), while in other embodiments the processors 702 may be distributed across a number of locations.

The one or more processors 702 may also operate to support performance of the relevant operations in a "cloud computing" environment or as a "software as a service" (SaaS). For example, at least some of the operations may be performed by a group of computers (as examples of machines including processors 702), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 702, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 702 executing a computer program to perform functions by operating on input data and generating output 114. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 702), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
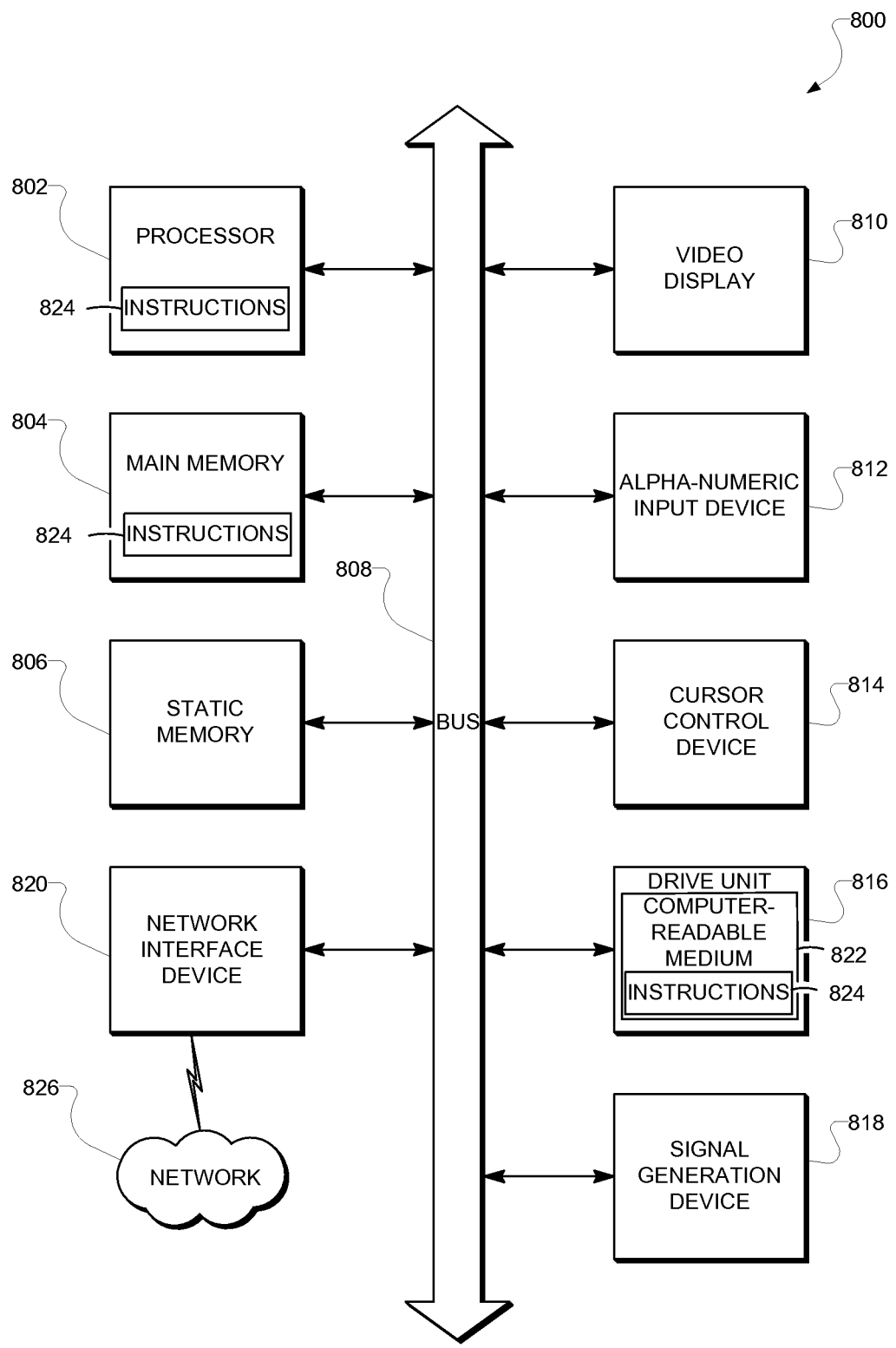
FIG. 8 is a block diagram of machine in the example form of a computer system within which instructions, for causing the machine to perform any one or more of the methodologies discussed herein, may be executed.

FIG. 8 is a block diagram of machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions 824 for execution by the machine and that cause the machine to perform any one or more of the methodologies of the present disclosure or that is capable of storing, encoding or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for performing event stream processing comprising:
   receiving an input query;
   parsing, by or more processors, the input query into a single directed acyclic graph (DAG) including a plurality of operator nodes, the operator nodes each defining an operator to perform on input data;
   creating, by one or more processors, a grouping of one or more of the operator nodes;
   creating, by one or more processors, one or more partitions in the single DAG by forming one or more duplicates of the grouping and placing the one or more duplicates in the single DAG along with the grouping;
   creating, by one or more processors, a splitter node in the single DAG, the splitter node defining an operator to split data from one or more event streams among the grouping in the single DAG and the one or more duplicates of the grouping in the single DAG; and
   resolving, by one or more processors, the input query by processing data from one or more event streams using the single DAG, including executing the operator defined by the splitter node to split data from the one or more event streams to the grouping in the single DAG and the one or more duplicates of the grouping in the single DAG, the resolving further comprising executing operators defined by operator nodes in the grouping in the single DAG and the one or more duplicates of the grouping in the single DAG.

2. The method of claim 1, wherein the creating of the grouping occurs at a server level, resulting in operator nodes of a server being grouped.

3. The method of claim 1, further comprising creating a merge node, the merge node consolidating results of execution of the one or more partitions.

4. The method of claim 1, wherein the creating the one or more partitions uses a round-robin strategy.

5. The method of claim 1, wherein the creating the one or more partitions uses a hash-based strategy.

6. The method of claim 1, wherein the creating the one or more partitions uses a custom strategy based on user input of a logic which determines a target copy for a given data item.

7. The method of claim 1, further comprising creating a second grouping of one or more operator nodes nested within the grouping of one or more operator nodes.

8. An apparatus comprising:
   an event stream processing engine executable by a processor and configured to:
      receive an input query;
      parse the input query into a single directed acyclic graph (DAG) including a plurality of operator nodes, the operator nodes each defining an operator to perform on input data;
      create a grouping of one or more of the operator nodes;
      create one or more partitions in the single DAG by forming one or more duplicates of the grouping and placing the one or more duplicates in the single DAG along with the grouping;
      create a splitter node in the single DAG, the splitter node defining an operator to split data from one or more event streams among the grouping in the single DAG and the duplicates of the grouping in the single DAG; and
      resolve the input query by processing data from one or more event streams using the single DAG, including executing the operator defined by the splitter node to split data from the one or more event streams to the grouping in the single DAG and the one or more duplicates of the grouping in the single DAG, the resolving further comprising executing operators defined by operator nodes in the grouping in the single DAG and the one or more duplicates of the grouping in the single DAG.

9. The apparatus of claim 8, wherein the apparatus is coupled to one or more input adapters receiving input from at least one of the following: market data feeds, a message bus, network monitoring, application transactions, and internal event streams.

10. The apparatus of claim 8, wherein the apparatus is coupled to a database where results of the resolution of the input query are stored.

11. The apparatus of claim 8; wherein the apparatus is coupled to one or more applications where results of the resolution of the input query may be sent and displayed.

12. The apparatus of claim 8, wherein the creating of a grouping occurs at a server level, resulting in all operator nodes of a server being grouped.

13. The apparatus of claim 8, wherein the creating the one or more partitions uses a round-robin strategy.

14. The apparatus of claim 8, wherein the creating the one or more partitions uses a hash-based strategy.

15. A non-transitory machine-readable storage medium comprising instructions, which when implemented by one or more machines, cause the one or more machines to perform operations comprising:
   receiving an input query;
   parsing the input query into a single directed acyclic graph (DAG) including a plurality of operator nodes, the operator nodes each defining an operator to perform on input data;
   creating a grouping of one or more of the operator nodes;

creating one or more partitions in the single DAG by forming one or more duplicates of the grouping and placing the one or more duplicates in the single DAG along with the grouping;

creating a splitter node in the single DAG, the splitter node defining an operator to split data from one or more event streams among the grouping in the single DAG and the duplicates of the grouping in the single DAG; and resolving the input query by processing data from one or more event streams using the single DAG, including executing the operator defined by the splitter node to split data from the one or more event streams to the grouping in the single DAG and the one or more duplicates of the grouping in the single DAG, the resolving further comprising executing operators defined by operator nodes in the grouping in the single DAG and the one or more duplicates of the grouping in the single DAG.

16. The non-transitory machine-readable storage medium of claim 15, wherein the operations further comprise creating a merge node, the merge node consolidating results of execution of the one or more partitions.

17. The non-transitory machine-readable storage medium of claim 15, wherein the creating the one or more partitions uses a round-robin strategy.

18. The non-transitory machine-readable storage medium of claim 15, wherein the creating the one or more partitions uses a hash-based strategy.

19. The non-transitory machine-readable storage medium of claim 15, wherein the creating the one or more partitions uses a custom strategy that allows a user to provide a logic which determines a target copy for a given data item.

20. The non-transitory machine-readable storage medium of claim 15, wherein the operations comprise creating a second grouping of one or more operator nodes nested within the grouping of one or more operator nodes.

* * * * *